Feb. 24, 1953 C. A. LEVIN 2,629,322
DRIVE CONTROL MEANS FOR ROTARY DUPLICATING MACHINES
Filed Feb. 28, 1948 9 Sheets-Sheet 1

Inventor:
Carl A. Levin
By: Zahl & Guitbaugh
Attorneys

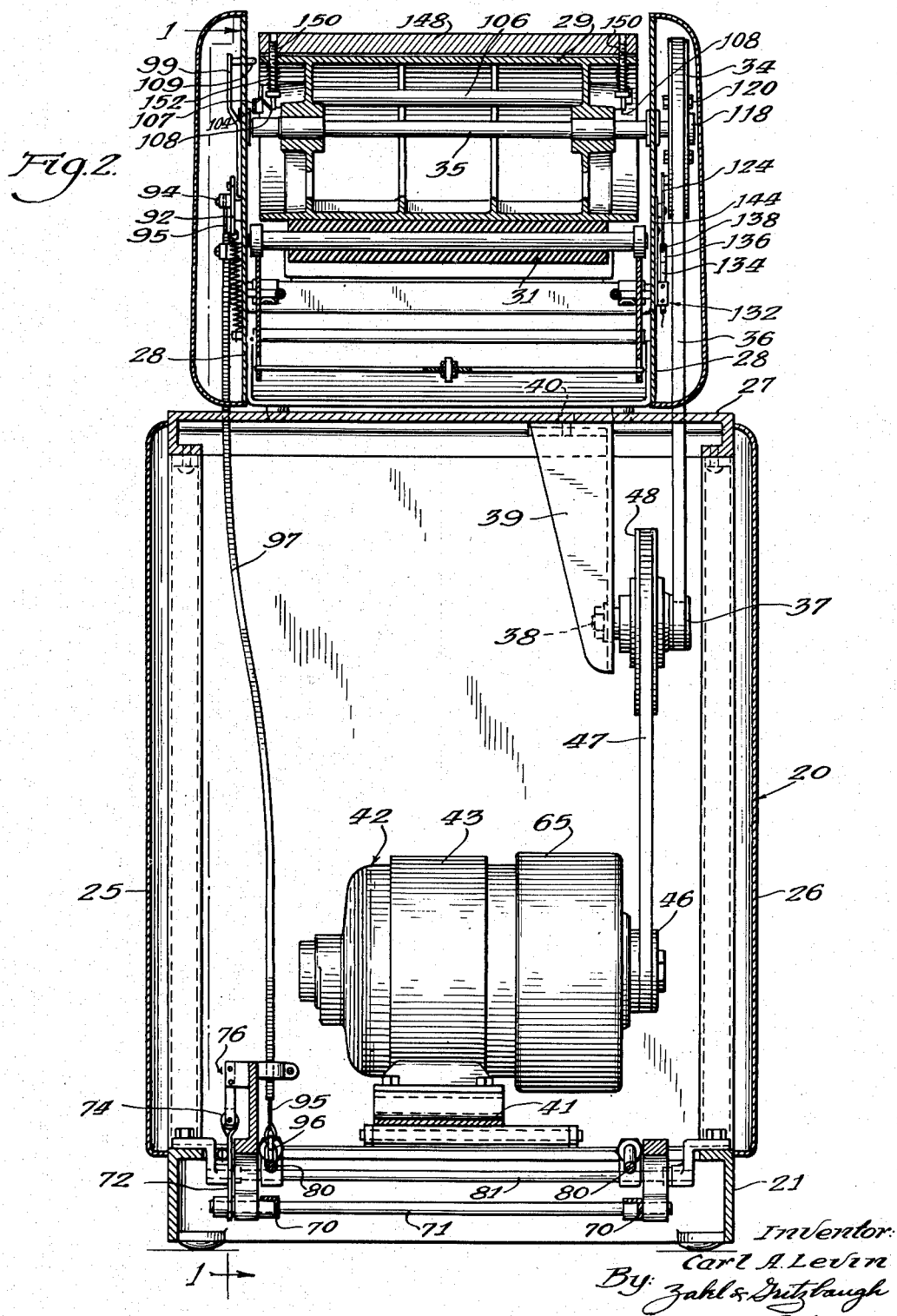

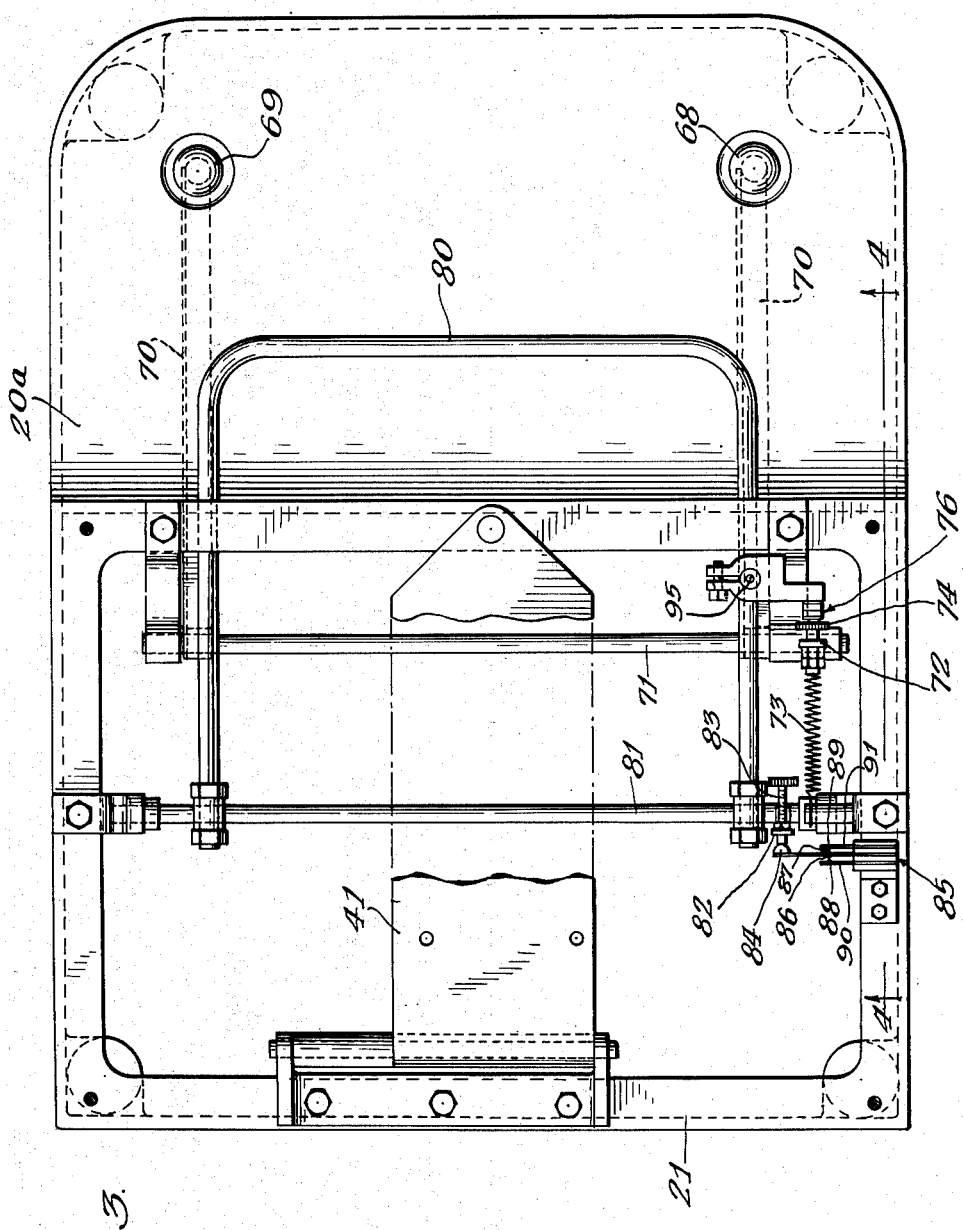

Feb. 24, 1953 C. A. LEVIN 2,629,322
DRIVE CONTROL MEANS FOR ROTARY DUPLICATING MACHINES
Filed Feb. 28, 1948 9 Sheets-Sheet 4
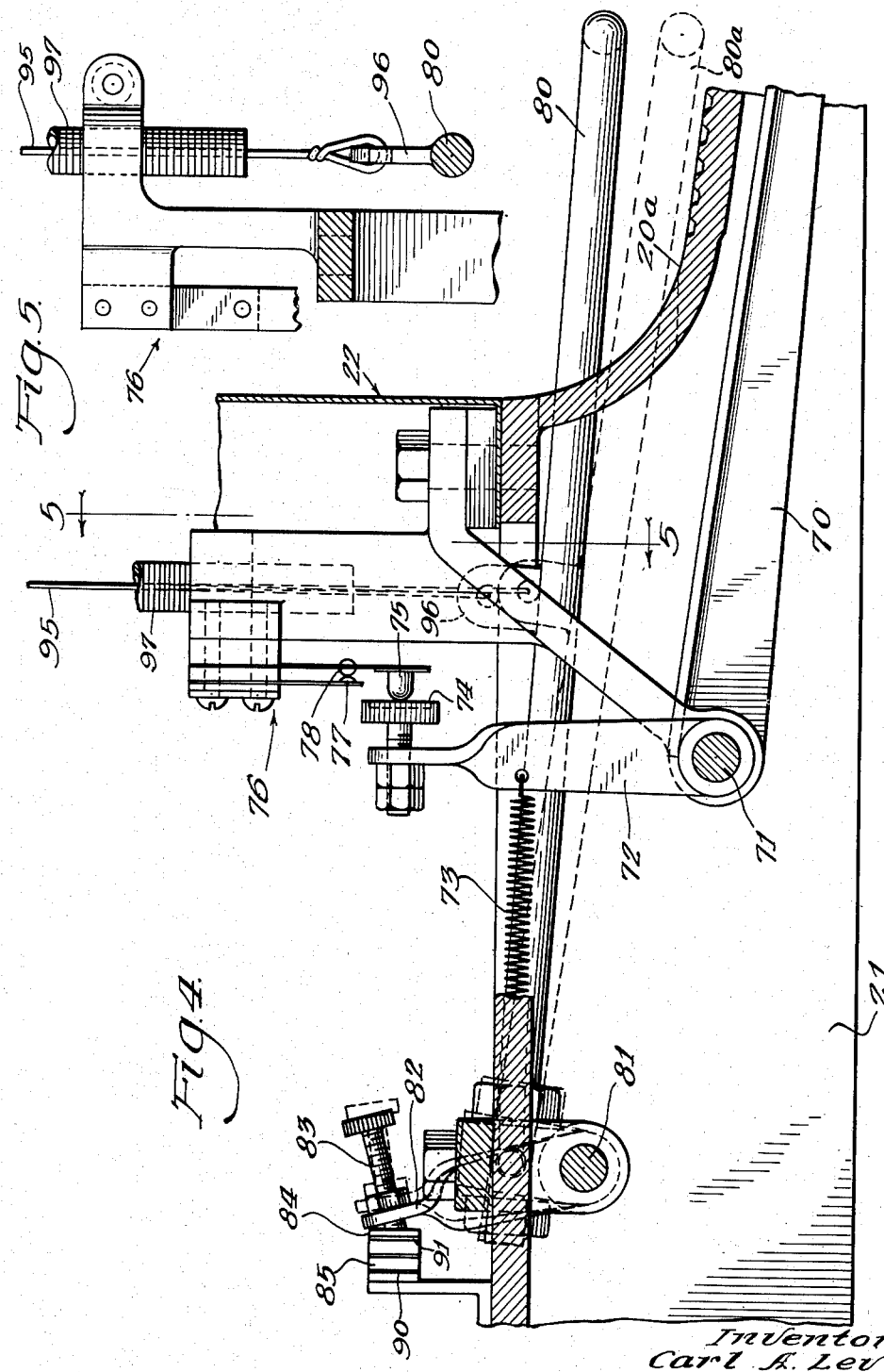
Inventor:
Carl A. Levin
By: Zahl & Gritzbaugh
Attorneys Feb. 24, 1953     C. A. LEVIN     2,629,322
DRIVE CONTROL MEANS FOR ROTARY DUPLICATING MACHINES
Filed Feb. 28, 1948     9 Sheets-Sheet 5
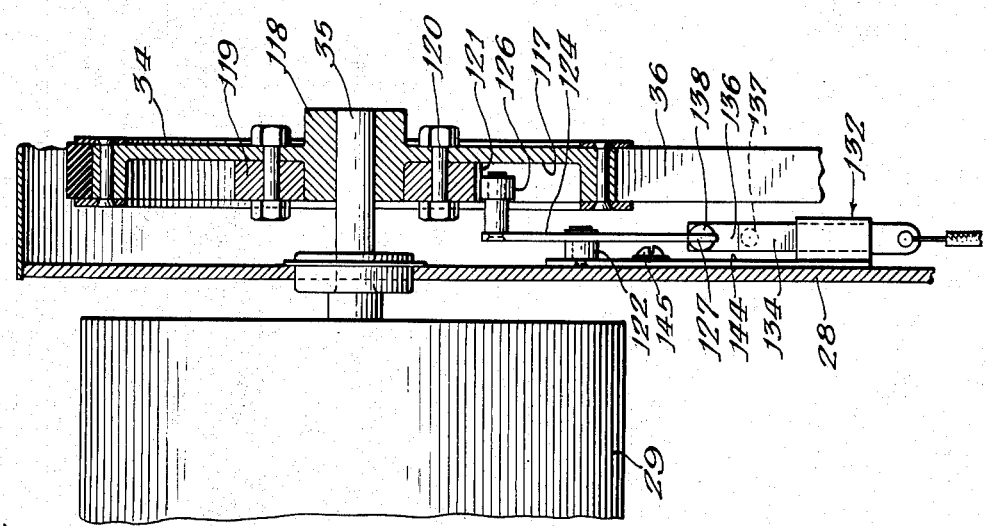
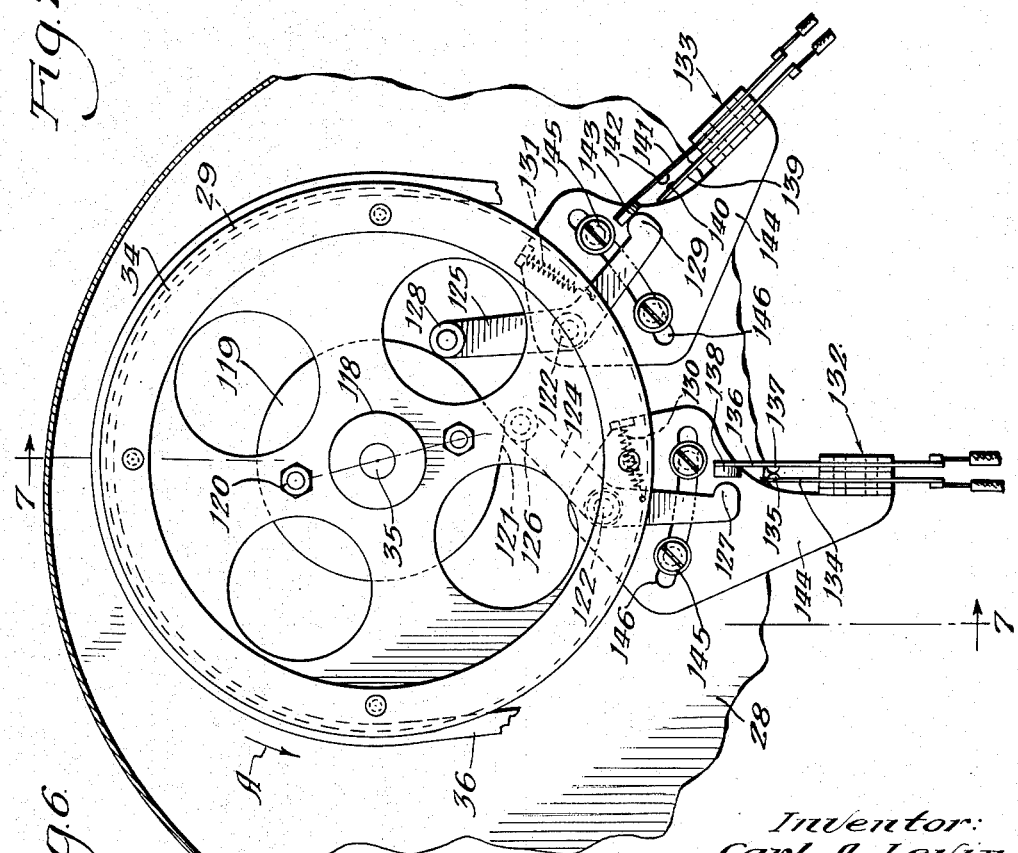
Inventor:
Carl A. Levin
By Zabel & Gritzbaugh
Attorneys

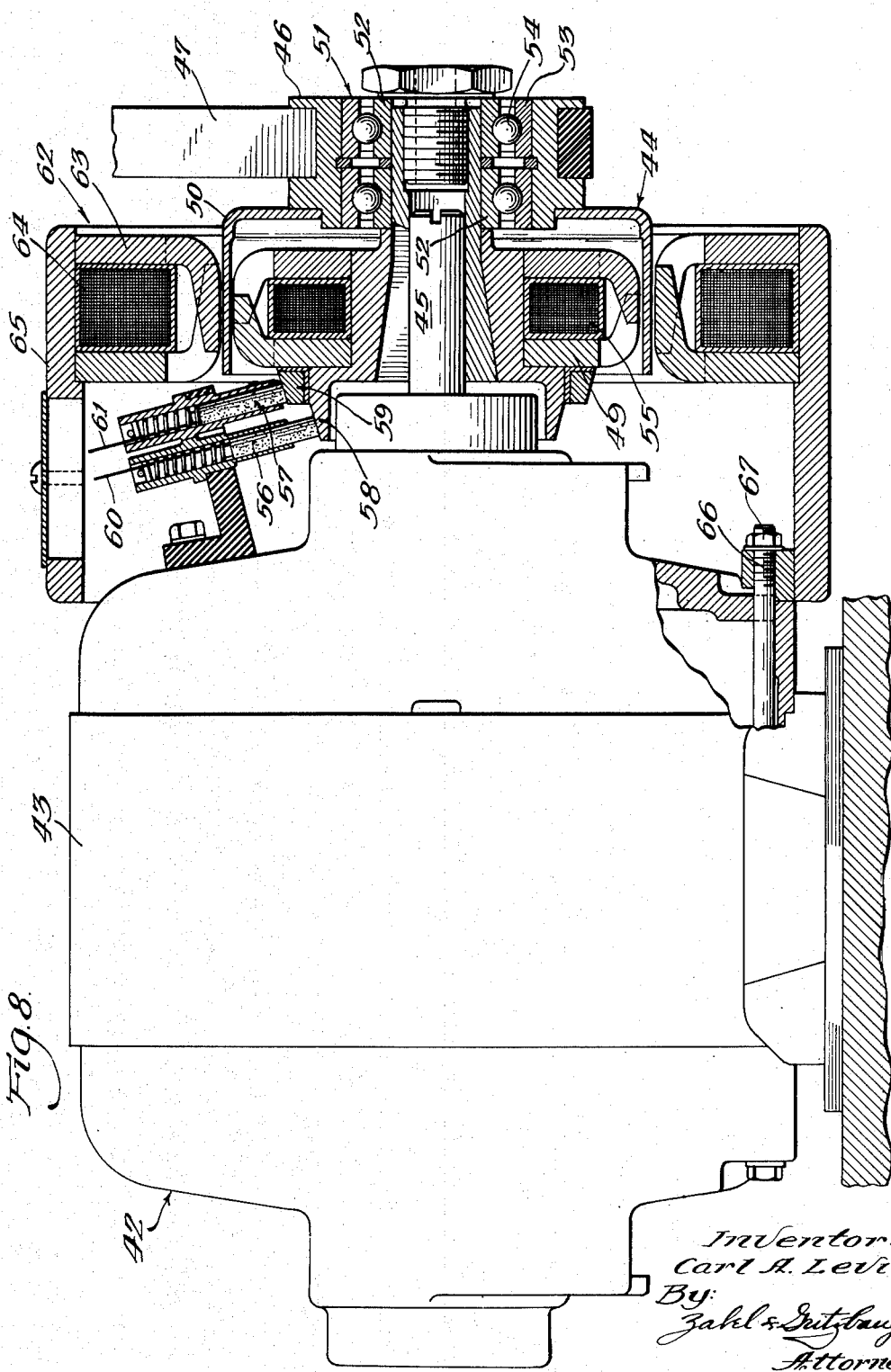

Feb. 24, 1953
C. A. LEVIN
2,629,322
DRIVE CONTROL MEANS FOR ROTARY DUPLICATING MACHINES
Filed Feb. 28, 1948
9 Sheets-Sheet 7
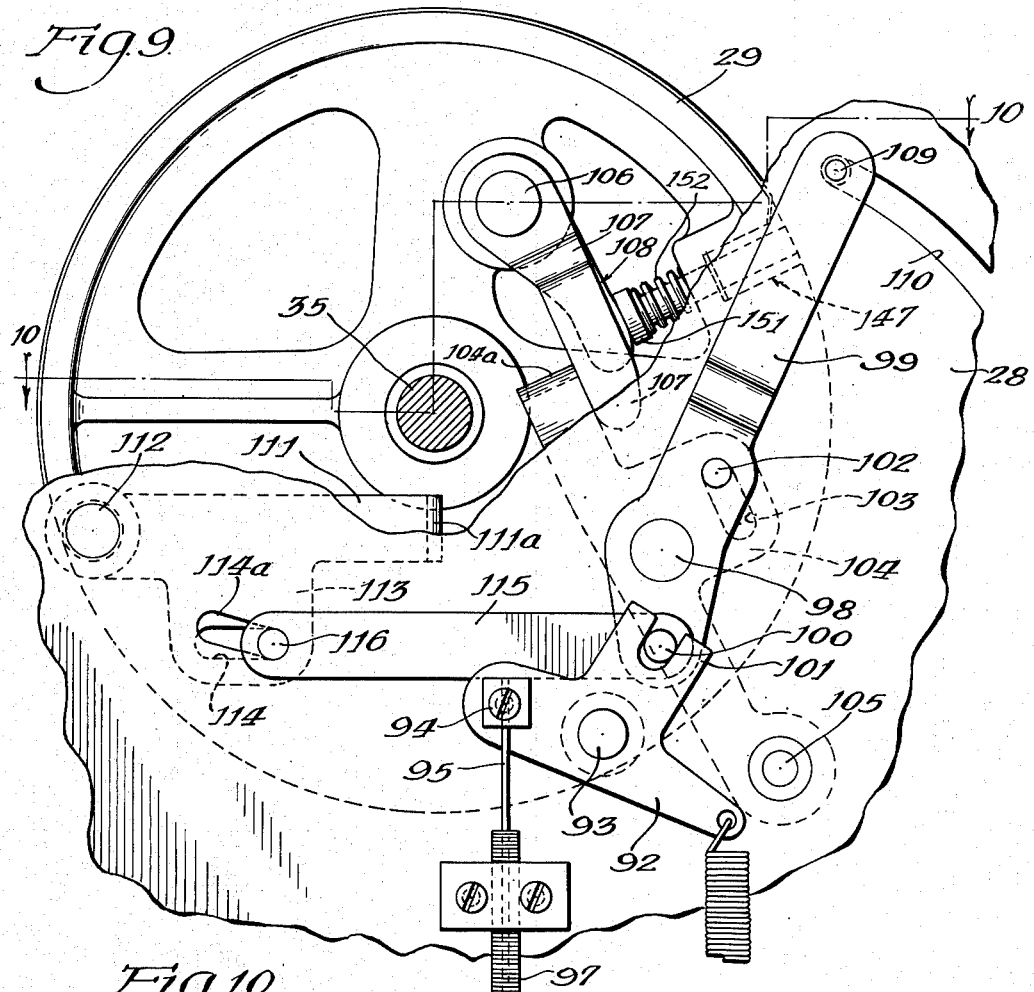
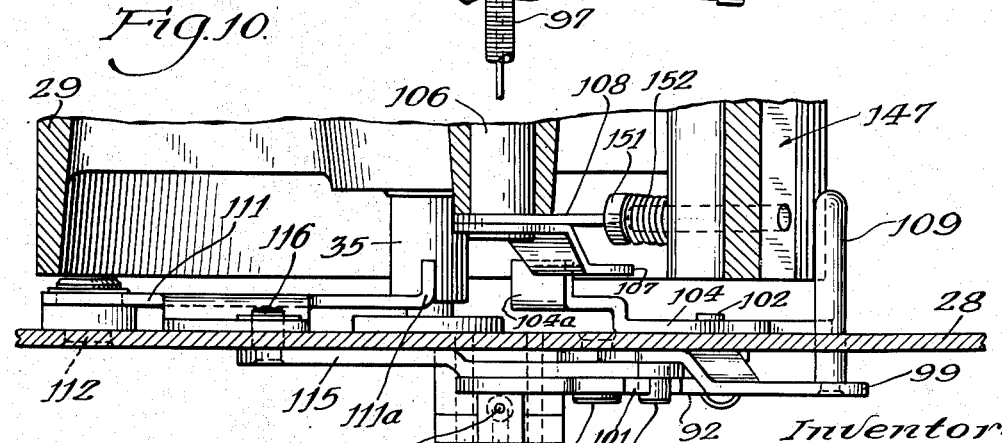
Inventor:
Carl A. Levin
By: Zabel & Gritzbaugh
Attorneys Inventor:
Carl A. Levin

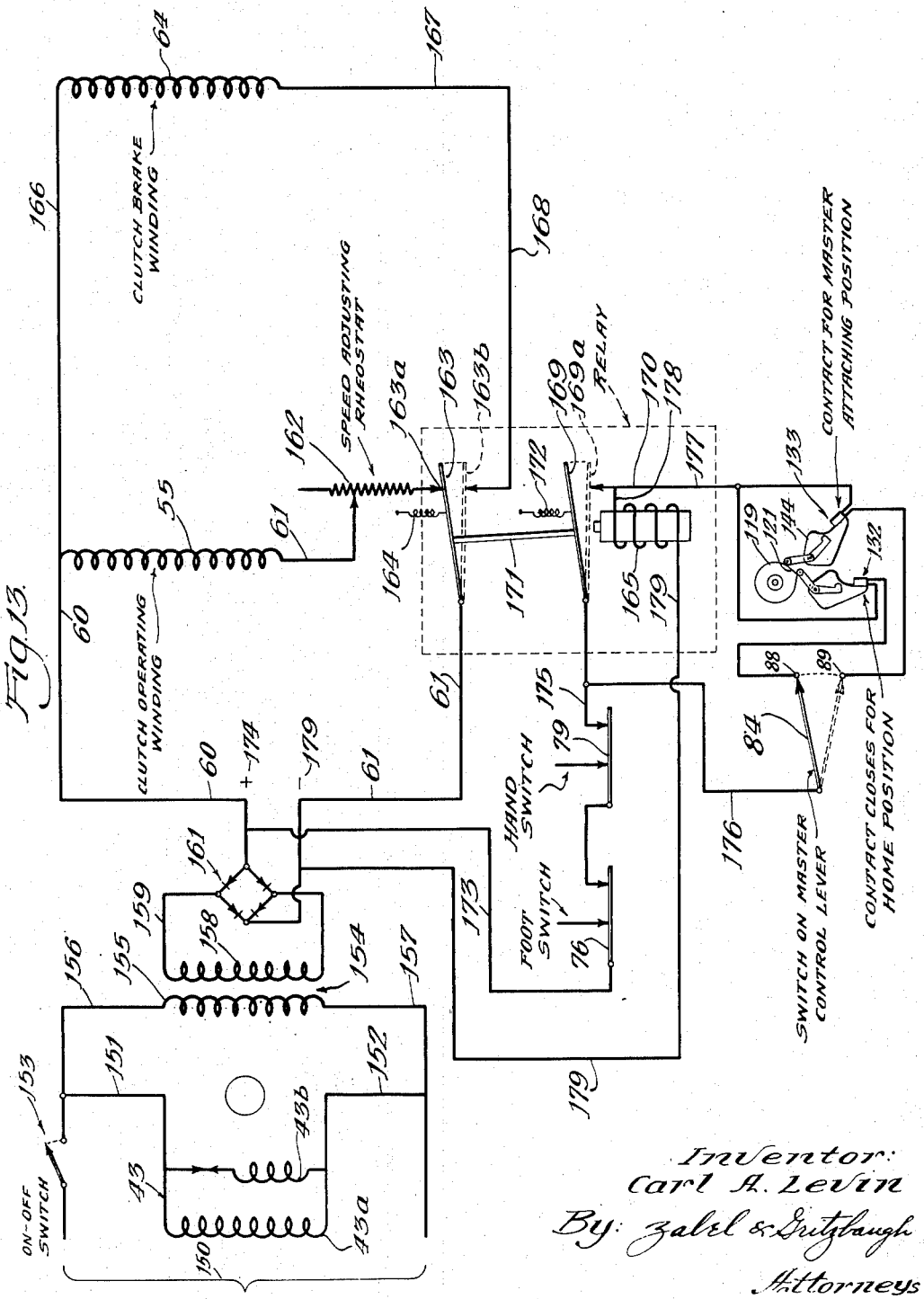

Patented Feb. 24, 1953

2,629,322

UNITED STATES PATENT OFFICE 2,629,322

DRIVE CONTROL MEANS FOR ROTARY DUPLICATING MACHINES

Carl A. Levin, Park Ridge, Ill., assignor to Ditto, Incorporated, Chicago, Ill., a corporation of West Virginia Application February 28, 1948, Serial No. 12,092

2 Claims. (Cl. 101—132)

The present invention relates to a duplicating machine and is specifically illustrated herein in conjunction with a machine of the wet process type.

In this type of machine a master sheet is clamped onto a rotatable drum and a plurality of blank sheets are fed one at a time between this drum and a platen that is held in engagement with the peripheral face of the drum. These blank sheets are fed to this drum by a pair of feed rollers, at least one of which provides a wet surface for moistening the blank sheets as they pass between the feed rollers. The moistened sheets passing between the platen and the peripheral face of the drum have transferred thereto the typed material that is disposed on the master sheet and the moistened sheets leaving the drum are normally deposited on a tray that is located on the side of the drum.

It is an object of the present invention to provide such a machine that is power driven at selectively variable speeds. It is contemplated that this machine can be operated by the mere pushing of a button and the machine drum can be stopped automatically at the proper position for initially attaching the master sheet by merely depressing a treadle and manipulating a starting button. A clamp or gripping device is provided on the drum for holding the master sheet in place and in the present machine this clamp is manipulated automatically without requiring the machine operator to touch the drum. When the desired number of copies have been "run off" on the machine the master sheet can be automatically removed from the drum and discharged from the machine by proper manipulation of the treadle and the button together, again without requiring the operator to touch the master sheet or the drum parts. All of this is accomplished in a simple and effective manner while at the same time the machine with its operating mechanism is extremely simple and foolproof.

The foregoing constitute some of the principal objects and advantages of the present invention, others of which will become apparent from the following description and the drawings, in which Fig. 1 is a side elevational view of a duplicating machine embodying the present invention, portions of the casing for the machine being broken away and shown in section;

Fig. 2 is a vertical sectional view through the machine, the view being taken on the line 2—2 of Fig. 1;

Fig. 3 is a horizontal sectional view through the machine, the view being taken on the line 3—3 of Fig. 1;

Fig. 4 is an enlarged fragmentary sectional view through the machine, the view being taken along the line 4—4 of Fig. 3;

Fig. 5 is a fragmentary vertical sectional view through the lower portion of the machine, the view being taken along the line 5—5 of Fig. 4;

Fig. 6 is an enlarged detail sectional view through one end of the shaft of the duplicating machine shown in Fig. 2 and illustrating the cam and rocker arm arrangement operating switches or circuit breakers at home and master attaching positions respectively of the drum;

Fig. 7 is a vertical sectional view through the shaft, the view being taken on the line 7—7 of Fig. 6;

Fig. 8 is an enlarged side elevational view shown partly in section of the motor and clutch unit illustrated in Figs. 1 and 2;

Fig. 9 is a fragmentary end elevational view of the duplicating machine with the machine casing removed, the view being taken at the opposite end of the shaft from that shown in Figs. 6 and 7 and illustrating the master releasing mechanism and with a portion of the machine frame broken away;

Fig. 10 is a horizontal sectional view through the drum shaft and master releasing mechanism, the view being taken along the line 10—10 of Fig. 9;

Fig. 13 is a wiring diagram showing the electrical circuit for the machine.

Figure 1:
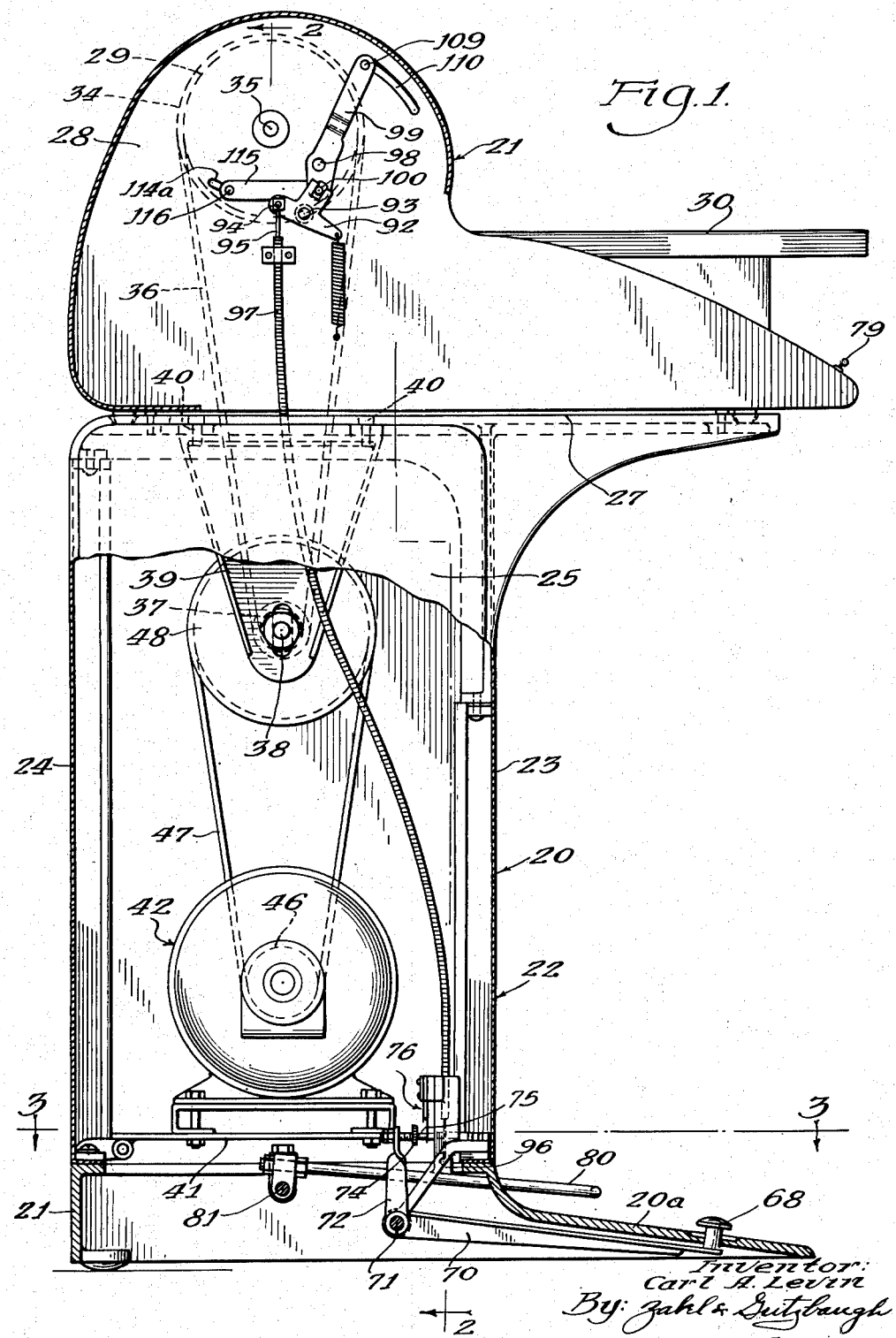

For purposes of illustration a specific embodiment of the present invention is shown in the drawings and will be described hereinafter. It is recognized, however, that many modifications may be made in the form of the invention shown without departing from the intended scope of the invention.

Referring now to the drawings and particularly to Figs. 1 to 3 inclusive an embodiment of a machine illustrating the present invention includes a base or machine stand generally indicated at 20 on which is mounted a duplicating machine generally indicated at 21. The base 20 comprises a base casting member 20a on which is mounted a housing 22 that comprises front and rear upright walls 23 and 24 respectively and spaced side walls 25 and 26. The duplicating machine 21 is mounted on a platform portion 27 provided at the upper end and forming the top of the base 20.

Figure 11:
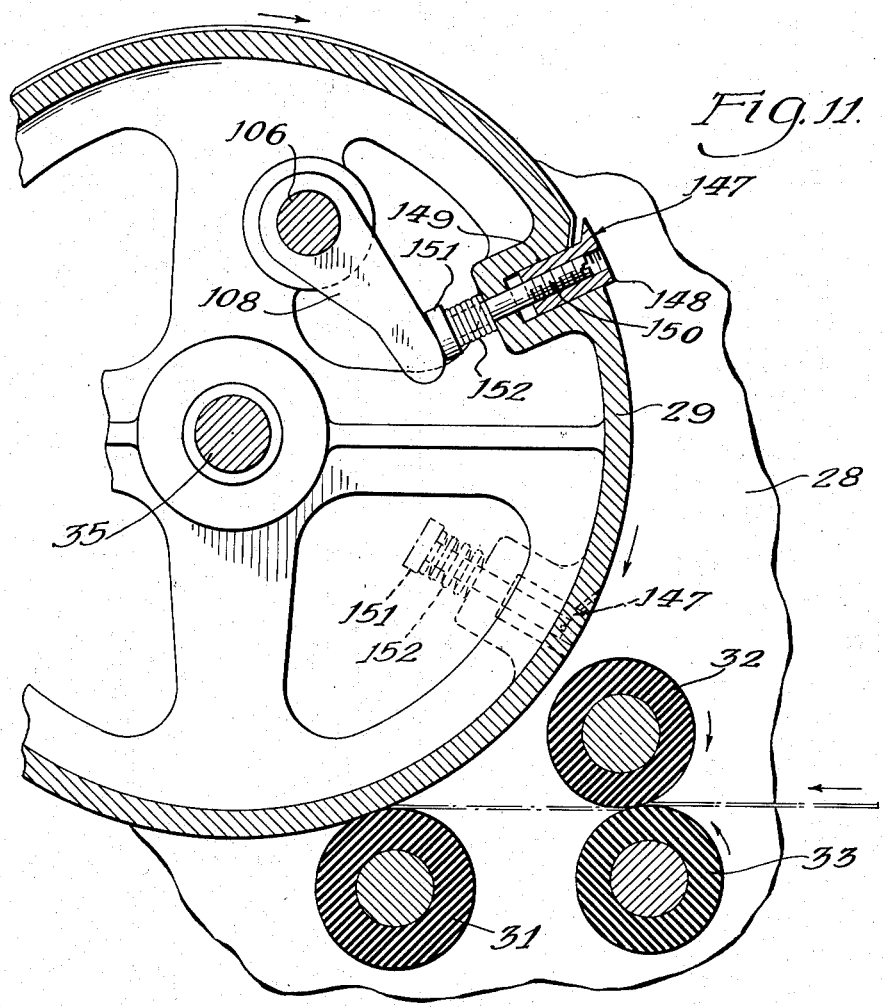
Fig. 11 is a vertical sectional view through the duplicating machine drum and illustrating the master clamp and a portion of the release mechanism and further illustrating more or less diagrammatically the relative positions of the drum, the platen and the feed rollers.

The duplicating machine 21 may be of a standard type that comprises generally a machine frame indicated at 28 in which is journalled a horizontally disposed rotatable drum 29. A paper supporting platform 30 is disposed below and adjacent to the drum 29 on the paper feed side thereof. A platen or pressure roller 31 (see Fig. 11) is disposed below and in contact with the periphery of the drum 29. The paper to be fed into the machine 21 is supported on the platform or tray 30 (Fig. 1) and is fed between a pair of feed rolls 32 and 33 that are caused to rotate simultaneously with the rotation of the drum 29. The paper thus fed between the feed rolls 32 and 33 is introduced between the platen 31 and the drum 29 and is then conveyed through the machine by cooperation between the rotating drum 29 and the platen 31. The upper feed roll 32 serves also as a moistening roller in a conventional manner.

As best shown in Figs. 1 and 2 a pulley wheel 34 is mounted on the end of shaft 35 that supports the drum 29 and this pulley wheel 34 is belt driven by a belt 36. The belt 36 operates about a lower pulley wheel 37 that is mounted on a shaft 38 that is journalled in a bracket 39. This bracket 39 is rigidly secured by bolts or the like as indicated at 40 in Fig. 1 to the platform 27 on the base 20.

Mounted in the lower extremity of the base 20 is a motor supporting platform 41 (see Figs. 1 and 2) upon which is mounted a motor and clutch assembly generally indicated at 42. This motor and clutch assembly 42 comprises a drive motor portion 43 (Fig. 8) and a clutch portion 44, the motor 43 being provided with a motor shaft 45, on the free end of which is mounted a pulley 46. A belt 47 operates about this pulley 46 and about a second pulley 48 that is mounted on the shaft 38 that carries the previously mentioned pulley 37. Thus the motor 43 is adapted to drive the drum 29 through the pulley drive belts 47 and 36 in the manner that appears obvious from Figs. 1 and 2.

The clutch portion 44 of the motor clutch unit 42 (Fig. 8) comprises a rotor 49 that is keyed or otherwise fixed to the motor shaft 45 and a cup-like stator 50 that is fixed to the pulley wheel 46. Between the motor shaft 45 and the pulley wheel 46 is a ball bearing assembly generally indicated at 51 that includes inner race members 52 that are fixed with respect to the motor shaft 45 and outer race members 53 that are adapted to sandwich therebetween ball bearings indicated at 54. Thus the pulley wheel 46 together with the cup-shaped stator 50 of the electromagnetic clutch 44 are rotatable as a unit independently of the shaft 45.

The rotor 49 may be of a conventional type for a magnetic clutch that includes a field winding 55 that is energized from an electrical source through contact brushes 56 and 57 that operate on commutators 58 and 59 respectively. The field winding 55 is placed in an electrical circuit with the commutators 58 and 59 in a well known manner and the brushes 56 and 57 are placed in a circuit with a source of electrical current by suitable conductors 60 and 61 respectively. Thus during the operation of the motor 43 the motor shaft 45 is rotated and the rotor portion 49 of the electromagnetic clutch 44 is caused to rotate with the motor shaft. During the period when the field winding 55 of the rotor is deenergized this rotor 49 rotates with the shaft 45 while the pulley wheel 46 and the stator 50 remain stationary. Upon closing of the circuit through the brushes 56 and 57 the field winding 55 of the rotor 49 becomes energized so as to rotate the stator 50 with the rotor 49, thereby rotating the pulley wheel 46. The drive for the drum 29 (Figs. 1 and 2) is thus established.

Mounted on the frame of the motor 43 (Fig. 8) is an electromagnetic brake generally indicated at 62 that includes a stationary electromagnetic field ring 63 supporting an electromagnetic field winding 64. This fixed ring is supported on an annular supporting ring 65 that is fixed to the machine casing in a suitable manner as by a plurality of studs, one of which is shown at 66 in Fig. 8 threaded to receive nuts 67. This field winding 64 is connected through a suitable electrical circuit to a source of electrical current as will be more fully described hereinafter in connection with the wiring diagram illustrated in Fig. 13. Upon energizing the field winding 64 of the electromagnetic brake 62 the rotating stator 50 of the electromagnetic clutch 44 is brought to rest in a well known manner resulting in the sudden stopping of the rotating drum 29 of the duplicating machine 21.

As will be more fully described hereinafter the drum 29 may be operated by manipulation of either of the foot switches 68 and 69 (Figs. 1 and 3) mounted in the base casting 20a and each of these foot switches is connected through an arm 70 to a common shaft 71 that is caused to rotate upon depressing either of the foot switches. Fixed to rotate with the shaft 71 is a switch arm 72 that is spring biased in one position as shown in Fig. 4 by a tension spring 73. The upper end of the switch arm 72 is provided with a switch operating face member 74 that engages a movable circuit breaker 75 of a normally closed switch generally indicated at 76. Upon depressing either foot switch 68 or 69, the switch arm 72 is caused to rotate so as to move circuit breaker 75 to separate switch contacts 77 and 78 of the normally closed switch 76. Upon releasing the pressure on either of the foot switches 68 or 69 the tension spring 73 returns the switch arm 72 to its normal spring biased position, thereby again closing the circuit through the switch 76.

For continuous operation of the machine a hand switch indicated at 79 is provided and this serves to close the circuit through the clutch operating winding 55 in the same manner as in depressing either of the foot switches 68 or 69.

Also mounted in the base casting 20a is a treadle 80 (see Figs. 1, 3 and 4) that is fixed to a shaft 81 journalled in the base casting 20a. Mounted on the shaft 81 and fixed to rotate therewith is an upstanding switch arm 82 that is provided with a switch engaging member 83 that engages a switch contact arm 84 of a switch 85. This contact arm 84 is provided with a pair of oppositely disposed contact points 86 and 87 adapted to engage contact points 88 and 89 respectively on contact arms 90 and 91 respectively. The switch contact arm 84 is normally disposed so that the contact points 86 and 88 are making contact, but upon depressing the treadle 80 the switch arm 82 is rotated by the shaft 81 to move the switch contact arm 84 so as to break the contact between points 86 and 88 and to close the circuit between contact points 87 and 89, Referring now to Figs. 1, 2 and 9 a bell crank lever 92 is pivotally mounted to rotate on a stud shaft 93 that is supported on the frame 28 of the duplicating machine 21. To one arm of the bell crank 92 is fastened as at 94 a cable 95 that projects downwardly through the machine base 20 and is secured at its lower end to an ear 96 that is integral with the treadle 80. This cable 95 may be housed in a flexible casing 97. Thus as the treadle 80 is moved between the two positions, illustrated in the solid line position 80 and the broken line position 80a in Fig. 4, the cable 95 rotates the bell crank lever 92 about its shaft 93. Rotatably mounted on a shaft 98 that is disposed directly above the shaft 93 (Fig. 9) is a lever arm 99 that is provided at its lower end with a lug 100 that is held between the jaws of a bifurcated portion 101 on the bell crank 92. Thus as the bell crank lever 92 rocks about its shaft 93 the lever arm 99 is caused to rotate about shaft 98. The lever arm 99 is provided with a lug 102 that rides in an elongated slot 103 in an arm 104, this last mentioned arm 104 being pivotally mounted at one end on a stud shaft 105 that is fixed to the wall of the machine frame 28. Thus as the arm 99 rotates about the shaft 98 it causes the rotation of arm 104 about shaft 105 by virtue of the cooperation between the lug 102 riding in the slot 103. A hand grasp knob 109 riding in slot 110 in the frame 28 is provided on the free end of lever arm 99 so that the arm 99 may be operated manually.

Mounted in the drum 29 is a horizontally disposed shaft 106 that is journalled to rotate in the walls of the drum 29 and fixed to this shaft 106 is an arm 107 disposed at the same side of the drum as the arm 104. The free end of the arm 104 indicated at 104a is adapted to engage the free end of the arm 107 under conditions to be more fully explained hereinafter. Also fixed to the shaft 106 is a pair of spaced lever arms 108, one being disposed at each end of the drum and being adapted to rotate with the shaft 106.

Again referring to Fig. 9 an arm 111 is pivoted about a stud shaft 112 on the duplicating machine frame 28 and this arm is provided with a downwardly projecting portion 113 having an elongated slot 114. A slot 114a is also provided in frame 28. A connecting link 115 is provided at one end with a lug 116 that is adapted to ride in the slots 114 and 114a. The other end of the link 115 is apertured so as to fit over the lug 100 on the lower end of arm 99. Thus as the arm 99 is rocked back and forth on its shaft 98 the link 115 imparts motion to the arm 111 to rock arm 111 about the shaft 112. The free end of the arm 111 is inturned as at 111a and is adapted to engage the free end of the arm 107 when the drum 29 is rotated under conditions also to be more fully explained hereinafter.

Figure 12:
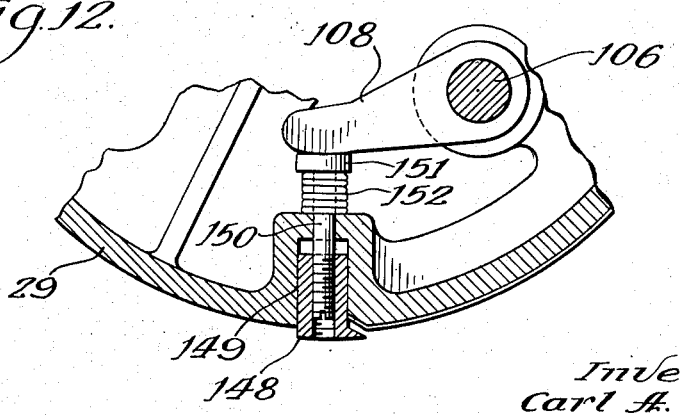
Fig. 12 is a fragmentary view corresponding with Fig. 11 but illustrating the master clamp in the master discharge position.

The drum 29 (see Figs. 9, 11, and 12) is provided with a master sheet gripper or clamp generally indicated at 147 that comprises a gripper element 148 that is slidably mounted in a recess 149 that is provided in the periphery of the drum 29. A stud 150 is threaded into the gripper element 148 at each end thereof and projects through the inner wall forming the recess 149 and is provided with a head 151 on the outer end thereof. A compression spring 152 is mounted concentrically about the stud 150 and is held between the head 151 and the inner wall forming the recess 149 and this compression spring serves to hold the gripper element 148 normally in its master sheet gripping position. To release the gripper, force must be applied against the head 151 of the stud 150 so as to compress the spring 152 and this is done by the lever arms 108 in a manner to be more fully described hereinafter.

Referring now to Figs. 2, 6 and 7 the pulley wheel 34 mounted on the end of shaft 35 is recessed on its inner face as at 117 and is provided with a hub portion 118. Mounted on this hub 118 and in the recessed face 117 of the pulley wheel 34 is a cam 119 that is fixed to the pulley wheel by means of bolts or the like 120. As best shown in Fig. 6 this cam 119 is circular throughout substantially its entire circumference and is provided with an outwardly cammed portion 121 at one position on the circumference.

Pivotally mounted on shafts 122 and 123 respectively that are fixed to the brackets 144 is a pair of rocker arms 124 and 125 respectively. Rocker arm 124 is provided with a cam follower roller 126 at one end and a switch engaging portion 127 on the other end. Rocker arm 125 is provided with a cam follower roller 128 at one end thereof and with a switch engaging portion 129 on the other end thereof. The rocker arm 124 is normally spring biased by a tension spring 130 in a position urging the cam follower 126 against the peripheral surface of the cam 119 and similarly the rocker arm 125 is normally spring biased by a tension spring 131. A circuit breaker 132 is disposed adjacent to the rocker arm 124 and a second circuit breaker 133 is disposed adjacent to the rocker arm 125.

The circuit breaker 132 comprises a stationary contact member 134 having a contact point 135 and a movable contact member 136 that is provided with a contact point 137. The movable contact member 136 has at its free end an actuating knob 138 that is adapted to be engaged by the switch operating portion 127 on rocker arm 124.

Circuit breaker 133 comprises a stationary contact member 139 having a contact point 140 and a movable contact member 141 having a contact point 142. The free end of the movable contact member 141 is provided with an actuating knob 143 that is adapted to be engaged by the switch operating portion 129 on rocker arm 125.

When the drum 29 rotates in the direction shown by the arrow A in Fig. 6 the cam follower rollers 126 and 128 ride along on the peripheral surface on the cam 119 and while these follower rollers are disposed on the normal circumference of the cam 119 the circuit breakers 132 and 133 are disposed in open switch position as illustrated by switch 133 in Fig. 6. When one of the follower rollers 126 or 128 rides up on the cam portion 121 of the cam 119 the respective rocker arm 124 or 125 is rotated so as to move the corresponding switch engaging portion 127 or 129 away from the corresponding actuating button 138 or 143 so as to close the corresponding circuit breaker 132 or 133. This closed condition of a circuit breaker is illustrated by switch 132 in Fig. 6.

As illustrated each of the circuit breakers 132 and 133 is mounted on a suitable mounting bracket 144. Each bracket 144 is provided with an arcuate slot 146 through which pass a pair of screws 145 that are threaded into the machine frame 28. Thus the position of each bracket 144 can be initially adjusted with respect to the drum 29, the adjustment being about the center of the drum. The rocker arm 124 or 125 is pivotally mounted as at 122 or 123 on the appropriate bracket 144 so that adjustment of the bracket effects proper adjustment or orientation of the rocker arm 124 or 125.

Fig. 13 illustrates a wiring diagram for energizing the motor portion 43 of the motor and clutch assembly 42 and for energizing the clutch portion 44 (see Figs. 2 and 8). The motor 43 includes a motor field winding 43a and a starting winding 43b (Fig. 13) since the motor illustrated is of the induction type. This motor 43 is connected across an A. C. line indicated at 150 by means of conductors 151 and 152. A manual switch 153 is provided in the power line 150 so that the entire system can be shut off. Also connected across the power line 150 is a transformer generally indicated at 154 in Fig. 13 that includes a primary winding 155 connected across the line 150 by means of conductors 156 and 157. The transformer secondary winding 158 is placed in a circuit by means of conductors 159 and 160 with a bridge type rectifier generally indicated at 161 which serves to convert the A. C. current of the power line to D. C. current for operating the clutch 44 and the associated relay circuits. The D. C. current is taken from the rectifier 161 through D. C. lines 60 and 61.

Again referring to Fig. 13 when the switch 153 is closed the motor 43 immediately starts operating and the primary winding 155 of the transformer 154 becomes energized so as to energize the D. C. circuit to the rectifier 161. Under these conditions the circuit is as shown in Fig. 13 so that the D. C. current passes through conductor 60, clutch winding 55, conductor 61, through a rheostat 162, normally closed circuit breaker 163 to the negative side of the rectifier 161 through conductor 61. The circuit breaker 163 is spring biased in the position shown in Fig. 13 by means of a spring 164. The drum 29 of the duplicating machine is thus rotated by motor 43 through the energized clutch 44 until the drum approaches home position where a relay coil 165 becomes energized as will presently be explained to move the circuit breaker 163 from its position against contact 163a to a second position indicated in broken lines against the lower contact 163b where the circuit through the clutch winding 55 is broken and the circuit through the electromagnetic brake winding 64 is completed to allow the current to flow through conductor 60 from the rectifier 161, conductor 166, the electromagnetic brake winding 64, conductors 167, 168 and then through the circuit breaker 163 that in this instance is disposed in the broken line position shown in Fig. 13 against the contact 163b and then to the negative side of the rectifier 161 through conductor 61. The drum 29 of the duplicating machine is thereby brought to rest at the home position and the machine is ready for operation.

The movement of the circuit breaker 163 between its two positions is effected by the relay 165 which upon energization moves a circuit breaker 169 to its broken line position 169a into contact with contact point 170. Circuit breakers 169 and 163 are mechanically connected to operate together by a link 171. The circuit breaker 169 is spring biased to its solid line or open position shown in Fig. 13 by means of a spring 172. When the relay 165 becomes deenergized the springs 164 and 172 return the circuit breakers 163 and 169 respectively to their solid line positions.

The relay 165 is operated by a circuit that includes a conductor 173 that is connected to the positive terminal 174 of the rectifier 161, the normally closed foot switch 76, the manually operated switch 79, conductors 175 and 176, switch 84 and then through a circuit that includes the circuit breaker 133 or a circuit that includes the circuit breaker 132, depending upon the position of switch 84, and then finally through conductor 177, conductor 178, relay coil 165 to the negative terminal 179 of the rectifier 161.

As previously mentioned when the manual switch 153 on the power lines 150 is first closed the drum 29 of the duplicating machine is caused to rotate until it reaches home position. As drum 29 is rotated (Fig. 6) the cam 119 is also caused to rotate in the direction of the arrow A and just before the drum reaches home position the cam portion 121 of the cam 119 engages the follower 126 on rocker arm 124 so as to momentarily move the contact point 127 of the rocker arm 124 away from actuating knob 138 on the circuit breaker 132 so as to close the circuit breaker 132 and energize the relay 165 (Fig. 13). The energized relay 165 thus moves circuit breaker 169a to its broken line position which also moves circuit breaker 163 to its broken line position in engagement with contact 163b so as to energize the clutch brake winding 64 and bring the drum 29 to rest at its home position. When the drum moves to its home position the follower 126 has passed beyond the cam portion 121 of the cam 119 so as to again return the rocker arm 124 to a position corresponding to rocker arm 125 as shown in Fig. 6 where the circuit breaker 132 would be held in its open position. The circuit to the relay coil 165 however is still held closed by virtue of the fact that the circuit breaker 169 is disposed in its broken line position in engagement with contact 170 so that current now flows from the positive terminal 174, of the rectifier 161, through conductor 173, normally closed foot switch 76 (operated by foot button 61 shown in Fig. 1), normally closed manually operated switch 79, conductor 175, circuit breaker 169, through contact 170, conductor 178, relay coil 165 to the negative terminal 179 of the rectifier 161.

To operate the machine and effect one complete revolution of the duplicating drum 29, one of the push buttons 68 (see Figs. 1, 3 and 13) is momentarily depressed so as to interrupt the circuit just described through the relay coil 165 and as a result of thus depressing the foot switch 76 the circuit breakers 169 and 163 are returned to their solid line position shown in Fig. 13 by operation of the springs 164 and 172. Pressure is then released from the foot switch 76, causing it to return to its normally closed position shown in Fig. 13 so that the circuit through the relay coil 165 is reset for operation of the cam 119 (Fig. 6) during rotation of the drum 29. As a result of this momentarily interrupting the circuit through the relay coil 165 the clutch portion winding 55 is again energized causing the motor 43 to drive the drum 29 of the duplicating machine through one complete revolution until circuit breaker 132 is again momentarily closed just before the drum 29 reaches home position so as to again energize relay coil 165 to move circuit breaker 163 to its broken line position shown in Fig. 13, thus again energizing clutch brake winding 64 to stop the drum 29 at home position. During this single revolution of the drum 29 a copy sheet can be run off from the master sheet.

For continuous operation of the machine hand switch 79 is manually moved to open position so as to interrupt the circuit to the relay coil 165 causing the circuit breaker 163 to move to its closed position shown in Fig. 13 to energize the clutch operating winding 55 and allow the motor 43 to drive the duplicating drum 29. As long as the manual hand switch 79 is retained in its open position the relay coil 165 is deenergized at all times so that the clutch operating winding remains energized and the drum continues to rotate. Upon closing hand switch 79 the drum 29 will finish this last revolution to return to home position by operation of the relay coil 165 in a manner previously described.

The rheostat 162 can be manually operated so as to place more or less resistance in the circuit to the clutch operating winding 55 so as to strengthen or weaken the electromagnetic field winding that operatively connects the stator 50 to the rotor 49 so as to produce relative slippage between the stator and the rotor. This results in a slower speed of rotation of the duplicating drum 29. The rheostat permits selective variation of drum speeds over a rather wide range.

The circuit breaker 133 functions in the same manner as circuit breaker 132 but is located at a different position relative to the circumference of the duplicator drum 29 so that when it operates to bring the drum to rest the drum is spaced from its home position by a distance corresponding to the spacing of the two circuit breakers. This new position of the drum is known as the master attaching position.

The drum 29 is brought to rest at master attaching position by depressing the foot treadle 80 (Fig. 1) at the time the foot switch 68 is momentarily depressed and the treadle 80 is held in this depressed position until the drum is brought to rest by operation of the control circuit. The depression of treadle 80 moves the control lever or circuit breaker 84 to its broken line position shown in Fig. 13 so as to place the relay coil 165 in the circuit that includes circuit breaker 133.

By referring to Fig. 6 it is seen that circuit breaker 133 is operated by rocker arm 125 that is provided with the cam follower 126 that rides on the cammed surface of cam 119. This circuit breaker 133 functions to momentarily energize the relay coil 165 in the same manner as previously described with respect to circuit breaker 132 and when the drum 29 reaches its master attaching position illustrated for example in Figs. 9 and 11, the master sheet gripper or clamp 147 is disposed in its open position shown in Fig. 11 to receive the master sheet that is manually applied to the drum. The drum is placed in this position by operation of the circuit through the circuit breaker 133 and is held in this position until the treadle 80 is released, at which time the control lever 84 is returned to its solid line position shown in Fig. 13. The drum remains in the master attaching position. The master sheet has thus been applied to the duplicator drum, and the machine is ready for operation.

The first copy sheet is fed to the drum while the drum is in the master attaching position and the first sheet is thus "run off" from the master sheet while the drum is rotating from the master attaching position to home position. Thus, for the first sheet, master attaching position of the drum actually serves as the home position.

The levers 104 and 111 are alternate devices for opening the gripper 147. Depression of the treadle 80 will cause both levers 111 and 104 to be rocked outwardly so that the bent-over portions 111a and 104a, respectively, lie in the path of lever 107. Thus, lever 107 will be engaged and cause the gripper 147 to be opened.

Lever 104 opens the gripper when the drum is stopped in its master changing position. As pointed out heretofore, the depression of the foot treadle 80 causes the deenergization of the clutch winding and the energization of the brake winding at a point somewhat in advance of the master changing position, which is the position shown in Figs. 9 and 11. This is for the reason that the drum is stopped not instantaneously, but is deaccelerated throughout a certain length of time, with the result that just as the drum comes to a stop, the lever 108 is displaced by the bent-over portion 104a to open the gripper. In this position, the master sheet can be removed and a new one inserted.

The lever 111 provides a means for opening the gripper momentarily right after it has passed pressure roller 31. The drum is not stopped when the gripper is opened at this point. Centrifugal force causes the leading edge of the master sheet to be thrown outwardly with the result that the master sheet is pealed away from the drum and is thrown into a suitable discharge tray, this being the same tray as that which receives the copy sheets.

To effect this operation, the treadle 80 is depressed at the same time that foot switches 68, 69 are depressed and the pressure on treadle 80 is maintained so that the drum will come to rest in its master changing position, at which time the gripper is again brought to its open position as indicated above. The advantage of this mode of operation is that the master sheet is automatically removed from the drum prior to the time that the drum is stopped. Thus, as the drum comes to rest in the master changing position, it is ready to receive a new master sheet.

Thus, the present arrangement, embodying as it does two separate means for actuating the gripper 147, permits the master sheet to be removed not only when the drum is stationary in master changing position, but also it permits the master sheet to be removed automatically at another point in the cycle of operation.

In the present embodiment of the invention the motor 43 is shown as an A. C. motor. Obviously the invention is also applicable to a D. C. motor drive in which case current limiting resistors would be employed instead of the rectifier 161 to provide the D. C. current source for the clutch assembly and the control circuit.

Throughout the specification and claims reference is made to a duplicating machine. This term is used in its broadest sense to include not only office duplicating machines, but any of the machines that utilize printing or like processes where a rotating drum is used from which the original material is duplicated by transferring to copy sheets.

I claim:

1. A duplicating machine including a rotatable duplicating drum having a home position of rest and a master attaching position, a motor, means connecting the motor to the drum including an electromagnetic clutch, an electrical source for energizing the clutch, a circuit placing the clutch in energizing relationship with the source including a circuit breaker spring biased to closed position, a control circuit for the clutch including a relay adapted when energized to open and maintain open the circuit breaker, a circuit for the relay including a normally closed interrupter switch, a second and a third normally closed interrupter switch, means operating the second and third interrupter switches including an actuating arm disposed adjacent to home position and a second actuating arm disposed adjacent to master attaching position, a cam on the drum adapted to engage both actuating arms, an electromagnetic brake adapted when energized to stop the rotation of the drum, and a circuit for energizing the brake including the circuit breaker, said circuit breaker serving to close the circuit to the brake when it opens the circuit to the clutch.

2. A duplicating machine including a rotatable duplicating drum having a home position of rest and a master attaching position, a motor, means connecting the motor to the drum including an electromagnetic clutch, an electrical source for energizing the clutch, a circuit placing the clutch in energizing relationship with the source including a circuit breaker spring biased to closed position, a control circuit for the clutch including a relay adapted when energized to open and maintain open the circuit breaker, and a circuit for the relay including a normally closed interrupter switch, a second and a third normally closed interrupter switch, and means operating the second and third interrupter switches including an actuating arm disposed adjacent to home position and a second actuating arm disposed adjacent to master attaching position, a cam on the drum adapted to engage both actuating arms, a master clamp on the drum, means for automatically opening the master clamp including a presetable mechanism disposed adjacent to master attaching position of the drum adapted to engage the master clamp, a foot operated lever connected to the presetable mechanism, an electromagnetic brake for selectively stopping the rotation of the drum at home and master attaching positions, and an electrical circuit for energizing the brake including a circuit breaker.

CARL A. LEVIN.

REFERENCES CITED

The following references are of record in the file of this patent:

UNITED STATES PATENTS

| Number | Name | Date |
|---|---|---|
| 1,687,587 | Pearne | Oct. 16, 1928 |
| 1,993,413 | Mellon | Mar. 5, 1935 |
| 2,176,897 | Fodor | Oct. 24, 1939 |
| 2,185,188 | Flanigan | Jan. 2, 1940 |
| 2,277,967 | Gibson | Mar. 31, 1942 |
| 2,411,122 | Winther | Nov. 12, 1946 |
| 2,421,823 | Allen et al. | June 10, 1947 |
| 2,423,028 | Horton et al. | June 24, 1947 |